March 16, 1926. 1,576,516
W. G. KOUPAL
PROCESS AND APPARATUS FOR ANNEALING A CONTINUOUSLY FORMED GLASS SHEET
Filed May 13, 1924 2 Sheets-Sheet 1
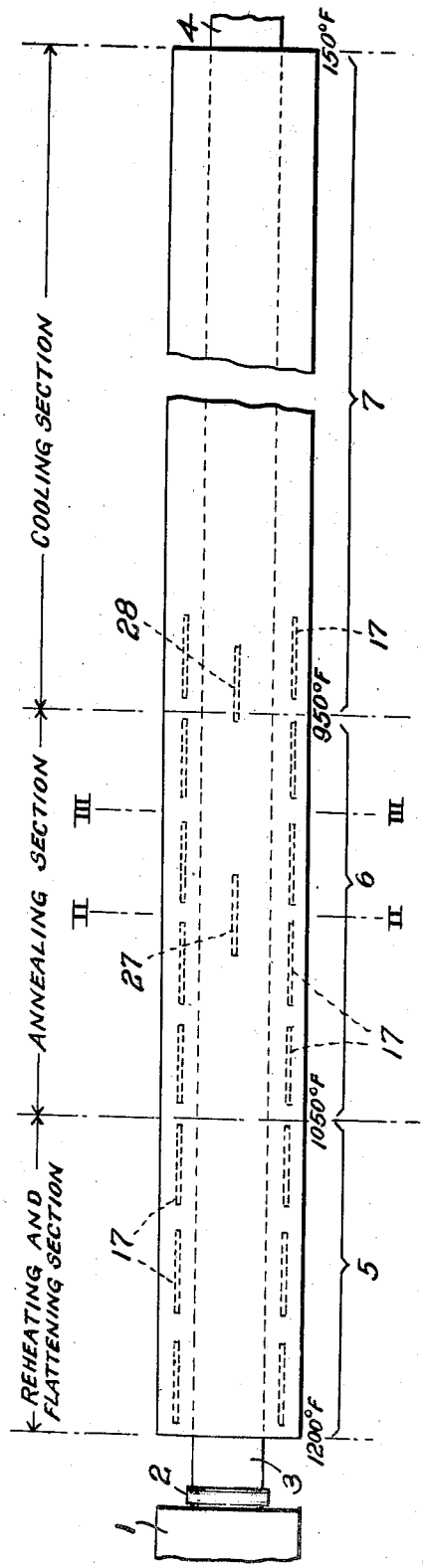

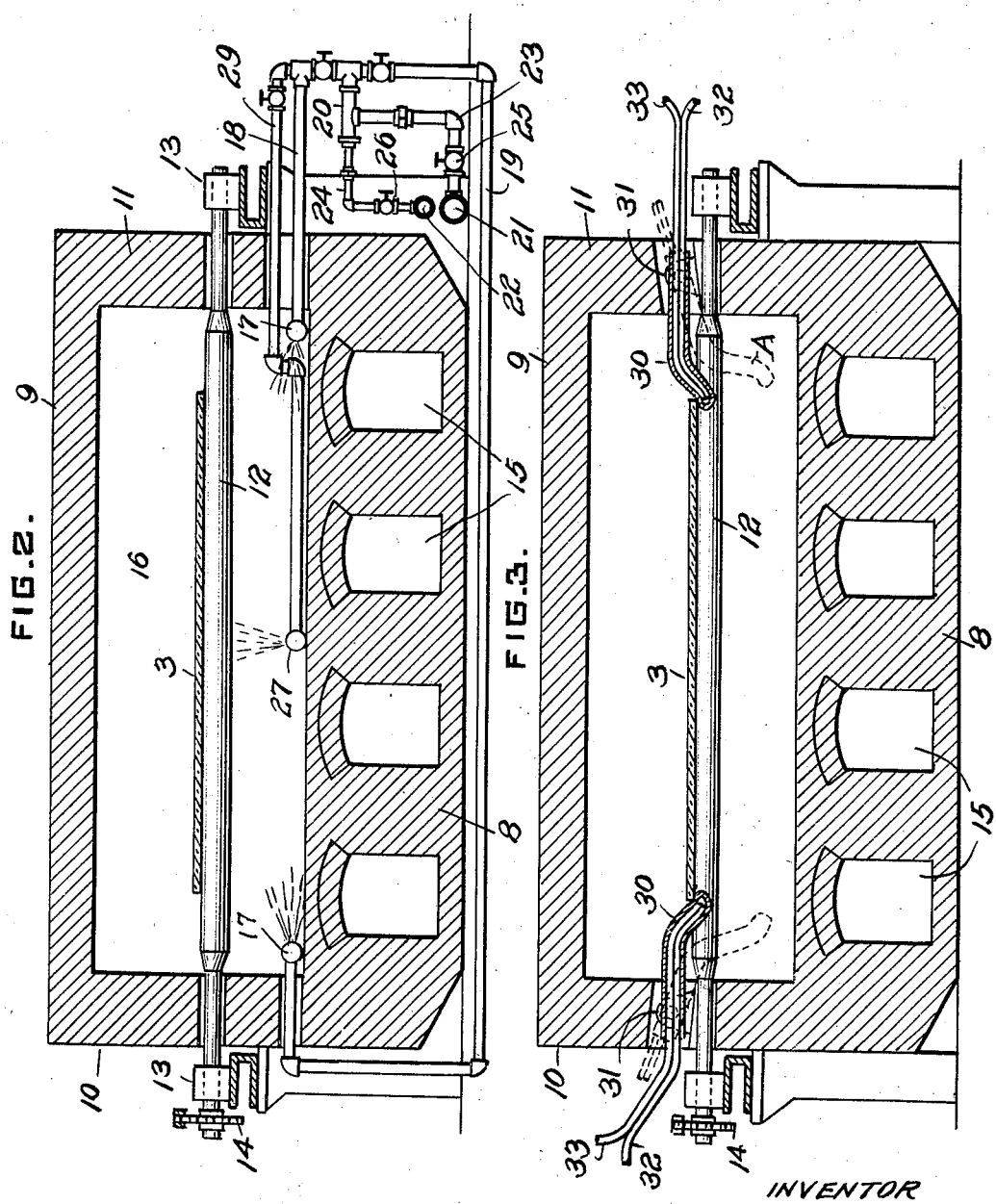

Patented Mar. 16, 1926.

1,576,516

UNITED STATES PATENT OFFICE.

WALTER G. KOUPAL, OF TARENTUM, PENNSYLVANIA, ASSIGNOR TO PITTSBURGH PLATE GLASS COMPANY, A CORPORATION OF PENNSYLVANIA.

PROCESS AND APPARATUS FOR ANNEALING A CONTINUOUSLY-FORMED GLASS SHEET.

Application filed May 13, 1924. Serial No. 713,086.

*To all whom it may concern:*

Be it known that I, WALTER G. KOUPAL, a citizen of the United States, and a resident of Tarentum, in the county of Allegheny and State of Pennsylvania, have made a new and useful invention in Improvements in a Process and Apparatus for Annealing a Continuously-Formed Glass Sheet, of which the following is a specification.

The invention relates to the annealing of a continuously formed glass sheet, such as that produced in the operation of the apparatus of the Gelstharp application, Serial Number 656,441, wherein the sheet or ribbon is withdrawn from the tank by the use of a pair of rolls and then passed into a roller leer where it is flattened and annealed. In the operation of a leer of this type, some difficulty has been experienced in keeping the glass flat as there is a tendency to bow as the glass approaches that part of the leer hereinafter referred to as the "cooling section". This is apparently due to the more rapid cooling of the sheet on its lower surface (in contact with and cooled by the leer rolls) than on its upper surface. The strain incident to this unequal cooling tends to start fractures longitudinally of the sheet and a crank, which is once started, causes very considerable loss due to its tendency to travel along the ribbon for considerable distances. I have found that these difficulties may be overcome by the method of heat control as hereinafter set forth which eliminates the bowing and strain and reduces the breakage incident to fractures. I have also provided a supplemental apparatus by means of which a longitudinal crack may be very readily stopped by cracking the sheet transversely. The leer construction preferably employed in securing these results is illustrated in the accompanying drawings wherein:

Figure 1 is a diagrammatic plan view showing the arrangement of the burners employed with relation to the leer sections. Fig. 2 is a transverse section on the line II—II of Fig. 1. And Fig. 3 is a transverse section on the line III—III of Fig. 1.

Referring to the general arrangement as indicated in Fig. 1, 1 is the outlet end of a melting tank carrying in its sides the rollers 2 between which the glass sheet 3 is formed. This sheet passes continuously through the leer, which is of the tunnel type, provided with rollers upon which the glass sheet is supported, and emerges at the outlet end as indicated at 4 where it is cut into sections.

From a functional standpoint, the leer may be regarded as divided into three parts which have been indicated in Fig. 1 as 5, 6 and 7. The part 5 is the reheating and flattening section, the part 6 is the annealing section, and the part 7 is the cooling section. In the reheating and flattening section, the glass passes through a range of temperature of approximately 1200° F. to 1050° F., and in this period of travel, the glass is first brought to uniform temperature and softened and then is caused to flatten of its own weight as it travels along over the rollers and gradually sets. In the annealing section 6, the temperature of the glass drops from approximately 1050° F. to 950° F., which drop of tempereure covers what is known as the critical annealing range, as it is between these temperatures that the actual annealing of ordinary lime soda glass occurs, what happens outside of this range having practically no effect upon the character of the tempering which results. In the cooling section 7, the glass drops in temperature from approximately 950° F. to 150° F., the purpose here being to get the temperature down to a point where the glass may be conveniently inspected, cut off and handled. The length of each of the three sections as heretofore referred to, depending as it does upon temperatures, will vary under different conditions, such as the thickness of the glass, the speed at which it is moving through the leer and the temperature which it has when it is introduced into the leer, but as a specific example of an average construction, the section 5 may be about 25 feet long, the section 6 about 30 to 40 feet long, and the section 7 about 250 feet long.

As indicated in Fig. 2, the leer is made up of the bottom wall 8, the top wall 9 and the side walls 10 and 11 with the rolls 12 for carrying the glass arranged in a series extending the length of the leer and located intermediate the top and bottom walls. These rolls are supported in suitable bearings 13 outside of the side walls and are driven by means of sprockets 14 operated from suitable chains, although any desired gearing may be employed for this purpose, the invention not being limited to any particular means for carrying the glass sheet through the leer. The bottom wall 8 is made relatively thick as indicated and provided with longitudinally extending flues 15 through which heated gases are passed. These flues assist in maintaining the temperature of the leer chamber 16, but the principal heating effect is secured by heat applied directly inside the leer chamber as hereinafter described, and the flues may be dispensed with if the bottom wall is made sufficiently thick to give the necessary insulation.

The primary heating effect in the leer chamber is secured by means of a series of longitudinally extending burners 17 arranged along the side walls of the leer chamber as indicated in Figs. 1 and 3. These burners are located along the sides of the sections 5 and 6, or only a slight distance past the section 6, as it is desired in the section 7 to secure a cooling effect so that no heating means are employed along the sides of this section. The burners 17 have discharge perforations along their inner sides so that the gases of combustion are directed inwardly toward the center line of the leer along the floor and the heat circulates up around the sheet applying a greater heating effect at the edges where the radiation of heat is normally greater and which would otherwise tend to cool off more rapidly than the central portion of the sheet. I have found that this method of applying the heat along the side walls of the leer and beneath the sheet tends to keep the sheet at a relatively uniform temperature throughout, thus reducing the tendency of the sheet to warp and break or to turn up at the edges due to unequal cooling. The burners 17 are all arranged in pairs and supplied with a mixture of gas and air through the pipes 18 and 19 from the mixer 20, and gas and air respectively are conducted thereto from the mains 21 and 22 by means of the branch pipes 23 and 24. The supply of gas is regulated by means of the valve 25 and the supply of air by means of the valve 26. Since both of the pipes 18 and 19 are supplied from the same mixer 20, each of the two opposing burners receives the same mixture and this mixture is at the same pressure for both burners, thus insuring a uniform application of heat on the two sides of the leer.

With this method of applying heat, there is still a slight tendency for the glass sheet to bow, as it approaches the end of the annealing section, due it is believed, to the more rapid cooling of the sheet or ribbon on its bottom surface in contact with the rolls than on its upper surface, and in order to counteract this tendency, a pair of central burners 27 and 28 are preferably employed, the burner 27 being located about midway of the ends of section 6, while the burner 28 is located at the right hand end of this section (Fig. 1). The location of these burners will vary somewhat depending upon conditions and the number of burners employed might also be modified. These burners consist of perforated pipes arranged to discharge upwardly as indicated in Fig. 2, so that an additional amount of heat is applied to the center of the sheet. This arrangement eliminates any bowing or warping of the sheet and tends to prevent the starting of cracks longitudinally of the sheet at this portion of the leer and incident to non-uniform cooling. These burners 27 and 28 are also supplied from the mixer 20 by means of the pipes 29.

If a crack longitudinally of the sheet does start, it is very readily stopped by means of the devices as indicated in Fig. 3, such devices being located opposite the point where the glass sheet arrives at a temperature of about 950° F. These devices consist of tubular members 30, arranged one on each side of the leer and supported for pivotal movement upon brackets 31 mounted in openings through the side walls. These members are water cooled by means of the circulation pipes 32 and 33. Normally, the members will occupy the inclined positions indicated at A in dotted lines, being at such time out of contact with the edges of the glass sheet 3. In case a crack starts longitudinally of the sheet, this may be interrupted by swinging the tubular members 30 to the positions indicated in full lines, at which time they contact with the two edges of the sheet. Due to their temperature, a crack is immediately caused running across the sheet from one tubular member to the other, so that when the longitudinal crack arrives at this point, it is interrupted. If desired, the connections may be applied so that these devices may be controlled by the examiner at the outlet end of the leer, thus acting to crack off the sheet as soon as a longitudinal crack is observed.

What I claim is:

1. In combination in a leer for annealing a continuously formed ribbon or sheet of glass comprising a tunnel leer chamber, means for supporting the glass sheet above the floor of the chamber and carrying it through the chamber, and gas heating means located in the leer chamber along its side walls below the level of the glass extending longitudinally thereof and directed inwardly so that a greater amount of heat from said means is applied to the side portions of the sheet than to the central portion.

2. In combination in a leer for annealing a continuously formed ribbon or sheet of glass comprising a tunnel leer chamber, means for supporting the glass sheet above the floor of the chamber and carrying it through the chamber, and gas heating means located in the leer chamber along its side walls below the level of the glass arranged to direct the burning gases of combustion laterally beneath the sheet or ribbon so that a greater amount of the heat from said gases is applied to the side portions of the sheet than to the central portion.

3. In combination in a leer for annealing a continuously formed ribbon or sheet of glass comprising a tunnel leer chamber, means for supporting the glass sheet above the floor of the chamber and carrying it through the chamber, pairs of gas heating burners located in the leer chamber longitudinally thereof and adjacent its opposite side walls below the level of the glass, and a single valve regulating means for controlling the flow of gas to both members of each pair so that the heat supplied on opposite sides of the leer chamber is the same, the said burners being arranged so that a greater amount of the heat therefrom is applied to the side portions of the sheet than to the central portion.

4. In combination in a leer for annealing a continuously formed ribbon or sheet of glass comprising a tunnel leer chamber, means for supporting the glass sheet above the floor of the chamber and carrying it through the chamber, heating means located in the chamber along the side walls, and a supplemental heating means also located in the chamber and extending longitudinally of the central portion thereof beneath the sheet or ribbon, said supplemental heating means being located in the section of the leer in which the sheet or ribbon passes through the critical annealing range.

5. In combination in a leer for annealing a continuously formed sheet or ribbon of glass comprising a tunnel leer chamber provided with heating means for securing a gradually reduced temperature throughout the length of the chamber and ranging from a temperature upwardly of 1050° F. at its entrance end to a temperature at which the glass can be cut and handled at its other end, means for carrying the sheet or ribbon through the chamber, and means for preventing warping and cracking, comprising supplemental heating means located in the leer chamber below the center of the sheet or ribbon, said supplemental heating means being located in the section of the leer in which the sheet or ribbon passes through the critical annealing range.

6. In combination in a leer for annealing a continuously formed sheet or ribbon of glass comprising a tunnel leer chamber provided with heating means for securing a gradually reduced temperature throughout the length of the chamber and ranging from a temperature upwardly of 1050° F. at its entrance end to a temperature at which the glass can be cut and handled at its other end, means for carrying the sheet or ribbon through the chamber, and means for cracking the sheet transversely, comprising water cooled metal members mounted opposite each other at the sides of the chamber so that they may be moved into contact with the side edges of the sheet or ribbon.

7. The process of annealing a continuously formed sheet or ribbon of glass which consists in feeding the sheet, while at a temperature upwards of 1050° F., into a leer chamber, applying heat to the sheet in the chamber along its side edges, as it cools down to and through the critical annealing range, and applying additional heat to the leer chamber beneath the central part of the sheet in that section of the leer in which the sheet passes through such critical annealing range.

In testimony whereof, I have hereunto subscribed my name this 3rd day of April, 1924.

WALTER G. KOUPAL.